(12) United States Patent
Kadiyala et al.

(10) Patent No.: US 11,190,818 B2
(45) Date of Patent: *Nov. 30, 2021

(54) CONTENT DELIVERY MONITOR

(71) Applicant: STREAMSEER, LLC, Highlands Ranch, CO (US)

(72) Inventors: Naveen Kadiyala, Highlands Ranch, CO (US); Shafi Hashemi, North Babylon, NY (US); Betson Thomas, New Hyde Park, NY (US)

(73) Assignee: STREAMSEER, LLC, Highlands Ranch, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/519,069

(22) Filed: Jul. 23, 2019

(65) Prior Publication Data

US 2019/0349618 A1 Nov. 14, 2019

Related U.S. Application Data

(63) Continuation of application No. 15/814,027, filed on Nov. 15, 2017, now Pat. No. 10,412,428.

(51) Int. Cl.
*H04N 21/845* (2011.01)
*H04N 21/442* (2011.01)
*H04N 21/24* (2011.01)
*H04H 20/14* (2008.01)
*H04H 60/59* (2008.01)

(52) U.S. Cl.
CPC ........ *H04N 21/2407* (2013.01); *H04H 20/14* (2013.01); *H04H 60/59* (2013.01); *H04N 21/442* (2013.01)

(58) Field of Classification Search
CPC .................................................. H04N 21/2407
See application file for complete search history.

(56) References Cited

U.S. PATENT DOCUMENTS

| 10,412,428 B2 * | 9/2019 | Kadiyala ............ H04N 21/2407 |
| 2016/0164761 A1 * | 6/2016 | Sathyanarayana .......................... H04L 65/4084 709/219 |
| 2019/0102404 A1 * | 4/2019 | Benedict ............. G06F 16/1748 |

* cited by examiner

*Primary Examiner* — Hsiungfei Peng
(74) *Attorney, Agent, or Firm* — Carter, DeLuca & Farrell LLP; George Likourezos; Bret P. Shapiro

(57) ABSTRACT

Technologies are generally described for systems and methods to identify defective segments of content data. The methods may comprise generating a monitor agent effective to generate a request for the content data. The methods may comprise deploying the monitor agent to an address. The monitor agent may be effective to extract the content data and to generate delivery data associated with the content data. The methods may comprise distributing the delivery data to a parameter processor. The methods may comprise generating parameter data. The parameter data may be effective to indicate a parameter level associated with a parameter of the content data. The methods may comprise generating performance data based on the parameter data. The performance data may be effective to indicate a number of defects among the content data. The methods may comprise identifying a number of defective segments among the content data based on the performance data.

15 Claims, 4 Drawing Sheets

CONTENT DELIVERY MONITOR

CROSS REFERENCE TO RELATED APPLICATIONS

The present application is a continuation of U.S. application Ser. No. 15/814,027 filed on Nov. 15, 2017, the disclosure of which is incorporated herein by reference.

BACKGROUND OF THE INVENTION

Unless otherwise indicated herein, the materials described in this section are not prior art to the claims in this application and are not admitted to be prior art by inclusion in this section.

Owners of content, such as live streaming events and/or videos, may employ a content delivery network to distribute the content to users who wish to view the content. In some examples, the content delivery network may distribute content data associated with the content over a network. Users may use devices such as computers or mobile devices, which may be connected to the network, to receive the content data in order to view the content.

SUMMARY OF THE INVENTION

In some examples, methods effective to identify defective segments of content data associated with a piece of content are generally described. The methods may comprise an agent generator of a monitor domain generating a monitor agent. The monitoring agent may be effective to generate a first request from a first address. The first request may be for the content data. The first request may be a simulation of a second request from a second address in a user domain. The methods may comprise a monitor processor of the monitor domain deploying the monitor agent to the first address. The monitor agent may be effective to extract the content data from a content delivery domain to the first address. The monitor agent may be effective to generate delivery data associated with the content data. The delivery data may include data associated with a delivery of the content data from the content delivery domain to the monitor agent at the first address. The methods may comprise a controller of the monitor domain receiving the delivery data from the monitor agent. The methods may comprise the controller distributing the delivery data to a parameter processor of the monitor domain. The methods may comprise the parameter processor generating parameter data. The parameter data may be effective to indicate a parameter level associated with a parameter of the content data. The methods may comprise a monitoring processor of the monitor domain generating performance data based on the parameter data. The performance data may be effective to indicate a number of defects among the content data. The methods may comprise an analytical data generator of the monitor domain identifying a number of defective segments among the content data based on the performance data. In some examples, systems effective to identify defective segments of content data associated with a piece of content are generally described. The systems may comprise a memory. The systems may comprise an agent generator configured to be in communication with the memory. The systems may comprise a monitor processor configured to be in communication with the agent generator and the memory. The systems may comprise a controller configured to be in communication with the monitor processor. The systems may comprise a parameter processor configured to be in communication with the controller and the monitor processor. The systems may comprise an analytical data generator configured to be in communication with the monitor processor. The agent generator may be configured to generate a monitor agent that is effective to generate a first request from a first address. The first request may be for the content data. The first request may be a simulation of a second request from a second address in a user domain. The monitor processor may be configured to deploy the monitor agent to the first address. The monitor agent may be effective to extract the content data from a content delivery domain. The monitor agent may be effective to generate delivery data associated with the content data. The delivery data may include data associated with a delivery of the content data from the content delivery domain to the monitor agent at the first address. The controller may be configured to receive the delivery data from the monitor agent and distribute the delivery data to the parameter processor. The parameter processor may be configured to generate parameter data. The parameter data may be effective to indicate a parameter level associated with a parameter of the content data. The parameter processor may be configured to send the parameter data to the monitor processor. The monitor processor may be further configured to generate performance data based on the parameter data. The performance data may be effective to indicate a number of defects among the content data. The monitor processor may be configured to send the performance data to the analytical data generator. The analytical data generator may be configured to, based on the performance data, identify a number of defective segments among the content data.

In some examples, systems effective to evaluate a delivery of content data from a content delivery domain to a user domain are generally described. The systems may comprise a memory configured to store the content data. The systems may comprise a content provider processor configured to be in communication with the memory. The content provider processor may be configured to distribute a copy of the content data to a content delivery domain. The systems may comprise an agent generator configured to be in communication with the memory. The systems may comprise a monitor processor configured to be in communication with the agent generator and the memory. The systems may comprise a controller configured to be in communication with the monitor processor. The systems may comprise a parameter processor configured to be in communication with the controller and the monitor processor. The systems may comprise an analytical data generator configured to be in communication with the monitor processor. The agent generator may be configured to generate a monitor agent that is effective to generate a first request from a first address. The first address may be for the content data distributed to the content delivery domain. The first request may be a simulation of a second request a second address in a user domain. The monitor processor may be configured to deploy the monitor agent to a second address. The monitor agent may be effective to extract the content data from the content delivery domain. The monitor agent may be effective to generate delivery data associated with the content data distributed from the content delivery domain. The delivery data may include data associated with a delivery of the content data from the content delivery domain to the monitor agent at the first address. The controller may be configured to receive the delivery data from the monitor agent and distribute the delivery data to the parameter processor. The parameter processor may be configured to generate parameter data. The parameter data may be effective to indicate a parameter level associated with a parameter of the content data. The parameter processor may be configured to send the parameter data to the monitor processor. The monitor processor may be further configured to generate performance data based on the parameter data. The performance data may be effective to indicate a number of defects among the content data. The monitor processor may be configured to send the performance data to the analytical data generator. The analytical data generator may be configured to, based on the performance data, identify a number of defective segments among the content data. A presence of defective segments among content data may be effective to indicate an efficiency of the delivery of the content data from the content delivery domain to the user domain. The analytical data generator may be configured to generate analytical data based on the performance data. The analytical data may be effective to indicate the identified defective segments among the content data. The analytical data generator may be configured to evaluate the delivery of the content data from the content delivery domain to the user domain based on the analytical data.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
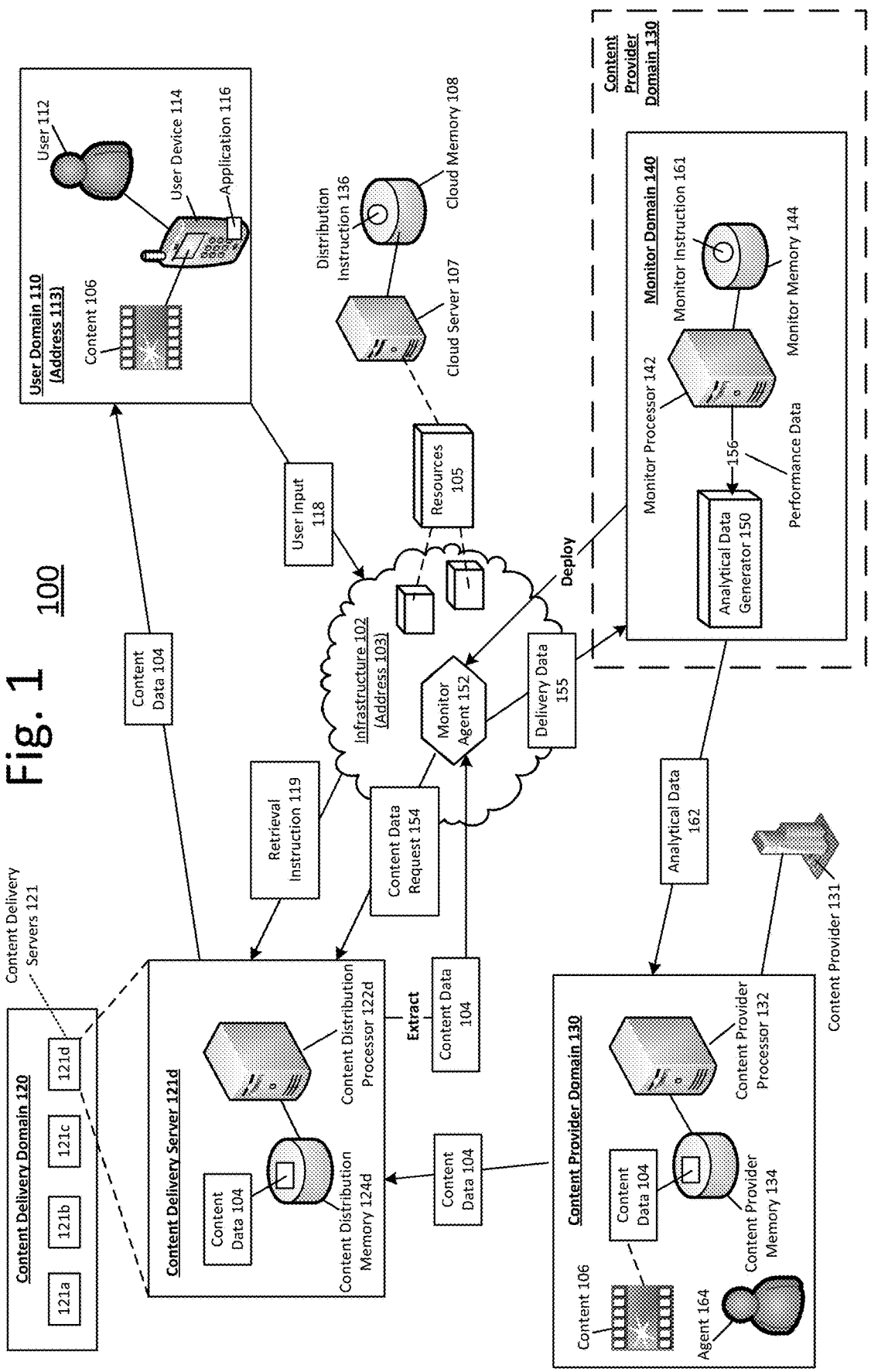
FIG. 1 illustrates a drawing of an example system to implement a content delivery monitor.

all arranged according to at least some embodiments described herein.

DETAILED DESCRIPTION OF THE PREFERRED EMBODIMENT(S)

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 illustrates a drawing of an example system to implement a content distribution monitor, arranged in accordance with at least some embodiments described herein. An example system 100 may include an infrastructure 102, a content delivery domain 120, a content provider domain 130, and/or a monitor domain 140. Infrastructure 102, content delivery domain 120, content provider domain 130, and/or monitor domain 140 may be configured to be in communication with each other through a network such as the Internet, WI-FI, a local area network, a wide area network, a cellular network, etc. In some examples, infrastructure 102 may be a cloud computing platform including one or more resources 105 (e.g., AMAZON WEB SERVICES), where resources 105 may include hardware resources such as processors, memories, servers (such as a cloud server 107 and a cloud memory 108), etc. Infrastructure may be located at a location that corresponds to an address 103 (e.g., an Internet Protocol (IP) address).

Content provider domain 130 may include a system that may be used by a content provider 131, where content provider 131 may be an entity (e.g., a company) that provides content to one or more users. Content provider 131 may also include a content distributor that distributes content to one or more users. In some examples, content provider 130 may provide content to users that may be subscribed to, or registered with, content provider 131. Content provided by content provider 131 may include videos such as movies, television shows, etc. Content provider domain 130 may include one or more pieces of hardware components, such as a content provider processor 132 and/or a content provider memory 134, configured to be in communication with each other. Content provider memory 134 may be configured to store one or more pieces of content data associated with corresponding content. For example, content provider memory 134 may store content data 104 that may be associated with content 106. Content data 104, when processed or rendered by a device (e.g., a user device 114), may be outputted as content 106. Content provider domain 130 may distribute one or more copies of content data 104 to one or more servers among content delivery domain 120 in order for content delivery domain 120 to distribute content data 104 to one or more user devices.

Content provider domain 130 may utilize resources 105 among infrastructure 102 to facilitate content distribution to users subscribed with content provider 131. In examples where infrastructure 102 may be a cloud computing platform, content provider 131 may pay the cloud computing platform for usage of resources 105 to execute a distribution instruction 136, where distribution instruction 136 includes instructions associated with distribution of content to user devices. For example, upon paying for usage of resources 105, content provider 131 may utilize cloud memory 108 to store distribution instruction 136, and may utilize cloud server 107 to execute distribution instruction 136.

Content delivery domain 120 may include one or more content delivery servers 121 (including 121a, 121b, 121c, 121d). Each content delivery server may be located in a respective location, such as a geographical region. Cloud server 107 may execute distribution instruction 136 to identify a content delivery server. Identification of a content delivery server may be based on one or more protocols relating to location, latency, bandwidth, content sharing, region, connection speed, etc. For example, cloud server 107 may identify a content delivery server that may be located in proximity, or closest, to user device 114. In the example shown in FIG. 1, content delivery server 121d may be located geographically closest to user device 114 when compared to locations of content delivery servers 121a, 121b, 121c. Each content delivery server 121 may include a respective processor, and respective memory configured to store respective set of content data. Focusing on content delivery server 121d, content delivery server 121d may include a content delivery processor 122d and a content delivery memory 124d, where content delivery memory 124d may store content data 104 that was received from content provider domain 130.

In an example, a user domain 110 may be configured to be in communication with content delivery domain 120. User domain 110 may include user device 114, where user device 114 may be used, or controlled, by a user 112. User device 114 may be configured to execute an application 116, where application 116 may be an application associated with content provider 131. For example, content provider 131 may be HBO, or, NETFLIX, etc., and application 116 may be an application executable by user device 114 to output content data, or to facilitate playback of content, provided by content provider 131. User 112 may control user device 114 to generate a user input 118 by use of application 116. For example, a user interface of application 116 may allow user 112 to select a particular piece of content, a playback quality of the particular piece of content, etc. User device 114 may send user input 118 to cloud server 107 among infrastructure 102, where user input 118 may include indications of a request for the particular piece of content, such as content 106.

Cloud server 107 may execute distribution instruction 136 to process user input 118, such as authenticating user device 114, identifying an indication of content 106 among user input 118, identifying an address 113 (e.g., an IP address) of user device 114, etc. Cloud server 107 may execute distribution instruction 136 to generate a retrieval instruction 119, where retrieval instruction 119 may include instructions effective to command content delivery domain 120 to send content data 104 (associated with content 106) to user device 114. For example, retrieval instruction 119 may include an instruction effective to command content delivery domain 120 to send content data 104 to user device 114 at address 113. As a result, user device 114 may receive content data 104 from content delivery domain 120 and may output content data 104 as content 106 in application 116. In some examples, an output of content data 104 may include rendering content data 104 in order for content data 104 to be output as content 106.

Monitor domain 140 may include a system comprising one or more pieces of hardware components configured to facilitate generation of analytical data 162, where analytical data 162 may include data effective to indicate one or more portions of content data 104. In some examples, the one or more portions of content data indicated by analytical data 162 may be detected portions of content data 104. In the example shown in FIG. 1, monitor domain 140 may include, at least, a monitor processor 142, a monitor memory 144, and an analytical data generator 150. Monitor processor 142, monitor memory 144, and analytical data generator 150 may be configured to be in communication with each other. In some examples, monitor processor 142 may be configured to control operations of analytical data generator 150 and other hardware components, such as special purpose processors, of monitor domain 140. Monitor memory 144 may be configured to store a monitor instruction 161, where monitor instruction 161 may include instructions effective to facilitate generation of one or more monitor agent(s) 152 (described below) and analytical data 162 (described below). In some examples, the system of monitor domain 140 may be a part of content provider domain 130, as shown by the dotted lines around monitor domain 140.

As will be further described below, monitor domain 140 may generate one or more monitor agent(s) 152. Monitor domain 140 may deploy monitor agent 152 to address 103 of infrastructure 102, where monitor agent 152 may include instructions, and resources 105 may execute instructions included in monitor agent 152 to perform one or more operations. For example, resources 105 may execute monitor agent 152 to facilitate extraction of content data 104 from content delivery domain 120. In some examples, monitor agent 152 may include instructions effective to simulate operations of one or more user devices in user domain 110. Examples of simulation may include performing operations (e.g., generation of data, requests, execution of instructions, etc.) based on a particular hardware, software, firmware, etc., of the one or more user devices in user domain 110. For example, resources 105 may execute monitor agent 152 to generate a content data request 154, where content data request 154 may include indications of a particular version of an operating system of user device 114, indications of address 113, or indications of other information related to user device 114, in order to simulate a request for content data 104 from user device 114. Monitor agent 152 may send content data request 154 to content delivery server 121d in order to request content data 104. Content delivery server 121d may receive content data request 154 and, in response, may send content data 104 to monitor agent 152. In some examples, resources 105 may execute instructions in monitor agent 152 to extract, or pull, content data 104 from content delivery domain 120. In examples where monitor agent 152 extract content data 104 from content delivery domain 120, content data request 154 may include an authentication request for content delivery server 121d to authenticate monitor agent 152. For example, content data request 154 may include indications of credentials associated with monitor agent 152. Content delivery server 121d may analyze the credentials included in content data request 154 and, upon a determination that the credentials are valid, may authorize monitor agent 152 to extract content data 104 from content delivery server 121d. In another example, content data request 154 may include a pre-authenticated token or equivalent mechanism proving authentication/authorization from an earlier request to a separate system owned by content delivery domain 120 or content provider domain 130. Content delivery server 121d may analyze the a pre-authenticated token or equivalent mechanism included in content data request 154 and, upon a determination that the a pre-authenticated token or equivalent mechanism is valid, may authorize monitor agent 152 to extract content data 104 from content delivery server 121d.

Monitor agent 152 may extract content data 104 from content delivery domain 120 and, in response, may generate delivery data 155, where delivery data 155 may include at least a portion of content data 104, and may include additional data relating to content data 104 (the additional data will be described below). Monitor agent 152 may send delivery data 155 to monitor domain 140. Monitor domain 140 may receive delivery data 155 and, in response, may generate performance data 156 based on delivery data 155. In some examples, monitor processor 142 may generate performance data 156, or may control one or more special purpose processors (further described below) among monitor domain 140 to generate performance data 156. In some examples, performance data 156 may include data effective to indicate whether a number of parameter defects (further described below) among content data 104. In some examples, performance data 156 may include data effective to indicate parameter levels associated with one or more parameters of an output of content data 104 (further described below). In some examples, performance data 156 may be based on a delivery of content data 104 from content delivery domain 120 to monitor agent 152. In some examples, performance data 156 may be associated with a performance of a delivery and/or an output of content data 104. For example, performance data 156 may include data effective to indicate a level of defect of an audio quality of content 106. A level of defect of the audio quality may be affected by factors such as latency, bandwidth availability, interference, noise, etc. The level of defect of the audio quality may be affected during the transmission of content data 104 from content delivery domain 120 to monitor agent 152 or during the original receipt, encoding, packaging or other preparatory steps of content delivery domain 120 obtaining content data 104 from content provider domain 130.

Monitor processor 142 may send performance data 156 to analytical data generator 150. Analytical data generator 150 may generate analytical data 162 based on performance data 156 and, in response, may send analytical data 162 to content provider domain 130. In some examples, analytical data 162 may include data effective to indicate one or more defected portions of content data 104. In some examples, analytical data 162 may further include data effective to indicate one or more recommendations associated with storage and/or delivery of content data 104 (further described below). Analytical data generator 150 may send analytical data 162 to content provider domain 130. Content provider 131 may use analytical data 162, received at content provider domain 130, to evaluate a delivery of content data 104. For example, content provider 121 may use analytical data 162 to determine whether to make adjustments, such as altering hardware resources, storage location of content data 104, etc., based on analytical data 162. In another example, agent 164 of content provider domain 130 may use analytical data 162 to determine whether to make adjustments based on analytical data 162.

Figure 2:
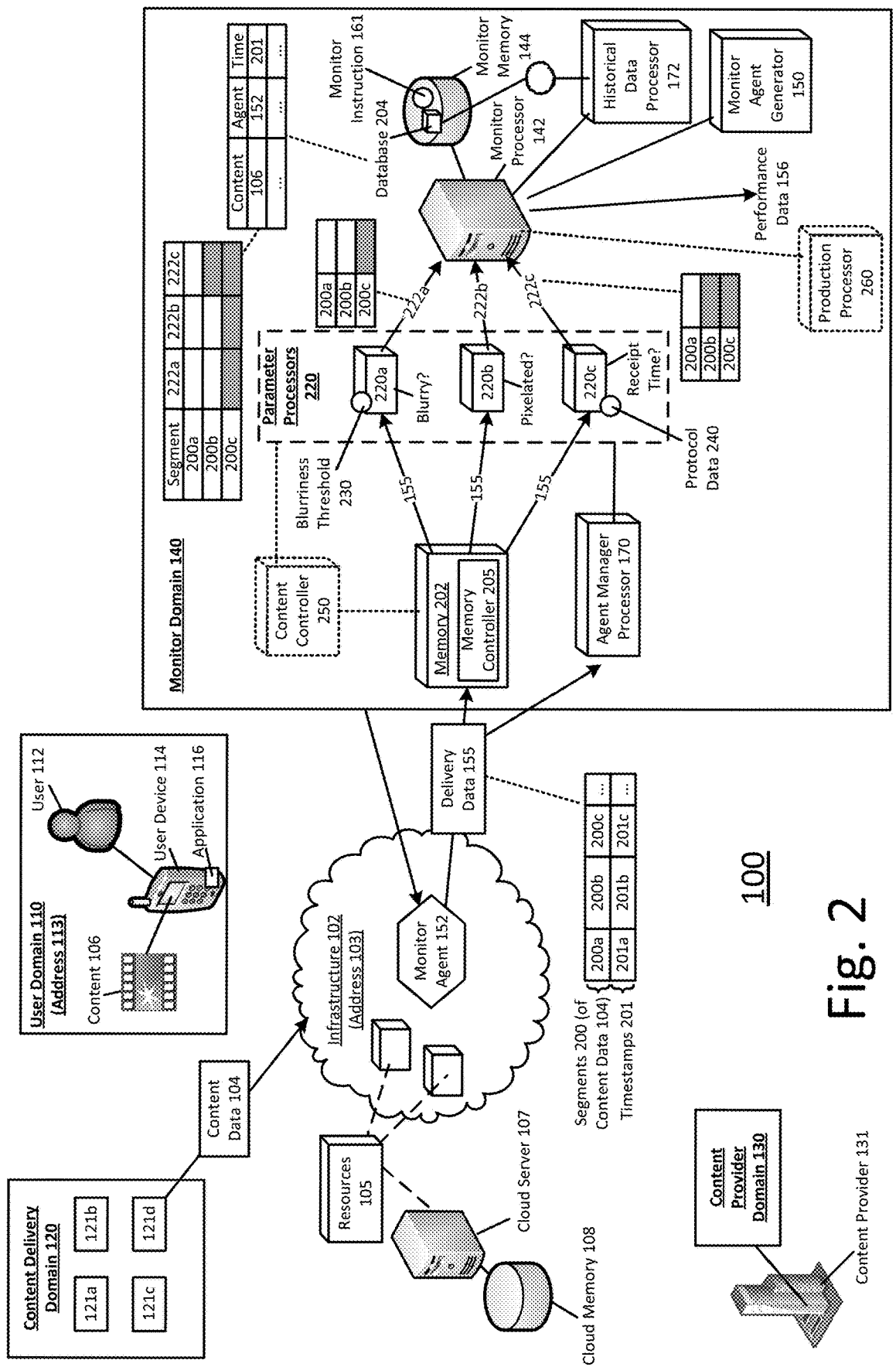
FIG. 2 illustrates the example system of FIG. 1 with additional details relating to an implementation of a content delivery monitor.

FIG. 2 illustrates the example system of FIG. 1 with additional details relating to an implementation of a content distribution monitor, arranged in accordance with at least some embodiments described herein. The example system in FIG. 2 could be implemented as, for example, system 100 discussed above. Those components in FIG. 2 that are labelled identically to components of FIG. 1 will not be described again for the purposes of clarity.

As will be described in more detail below, monitor domain 140 may include one or more parameter processors 220 (including 220a, 220b, 220c). Each parameter processor 220 may be configured to generate a respective set of parameter data 222 (including 222a, 222b, 222c). Each set of parameter data 222 may correspond to a particular parameter associated with content data 104, and may include data effective to indicate a parameter level of the corresponding parameter. In some examples, parameter data 222 may correspond to one or more segments of content data 104. Parameters may include receipt time, authenticity, blurriness, black screen, frozen screen, macroblocking, pixilation, framerate loss, audio availability, audio quality, data loss, etc. Monitor processor 142 may generate performance data 156 based on parameter data 222.

In an example, content data 104 may be partitioned into one or more segments 200 (including 200a, 200b, 200c). Each segment 200 may be a chunk, or a piece of data, that corresponds to a portion of content 106. For example, content 106 may be a video of a length of sixty minutes, and content data 104 may be partitioned into ten segments such that each segment may correspond to six minutes of the video. In some examples, segments 200 may be of same or different sizes (e.g., number of bytes), where a size of a segment may be based on content 106. In some examples, segments 200 may be arranged in a particular order, and the particular order may be indicated by manifest files and/or metadata associated with respective segments (further described below).

Monitor agent generator 150 may generate monitor agent 152 based on monitor instruction 161 stored in monitor memory 144. Monitor instruction 161 may include instructions for monitor agent generator 150 to generate monitor agents based on, one or more of, a model of a user device, a firmware version of a user device, an operating system of a user device, a content retrieval protocol, one or more locations of infrastructure 102, one or more locations of content delivery servers 121, etc.

In an example, content provider 131 may use monitor domain 140 to generate monitor agent 152 to simulate an IPHONE running on a particular version of an operating system (e.g., iOS 10.3.2) configured to retrieve content data 104 based on the Hypertext Transfer Protocol Live Streaming (HLS) protocol. Monitor agent generator 150 may retrieve portions of monitor instruction 161 that corresponds to IPHONE, the particular version of the operating system, and the HLS protocol, to generate monitor agent 152. In some examples, content provider 131 may also specify a particular infrastructure to deploy monitor agent 152. For example, content provider 131 may request to deploy monitor agent 152 to infrastructure 102. In some examples, content provider 131 may request to monitor content delivery performance of a particular geographical region. Monitor domain 140 may identify one or more content delivery servers 121 located within the particular geographical region and, in response, select the infrastructure to deploy monitor agent 152. In some examples, associations indicating locations of content delivery servers 121 with respect to one or more infrastructures may be stored in monitor memory 144. Monitor domain 140, or monitor processor 142, may identify content delivery servers 121 among the stored associations in order to identify an infrastructure to deploy monitor agent 152.

Monitor agent 152 may include instructions, or code, effective to simulate one or more operations of a user device as indicated by the request from content provider 131. For example, monitor agent 152 may simulate an IPHONE and retrieve content data 104 based on the HLS protocol. Monitor agent 152 may simulate one or more operations of a user device based on a specific version of a user device, an operating system of the user device, a client-player of the user device, specific protocols of the user device, etc. Further, monitor agent may generate timestamps 201 (including 201a, 201b, 201c) for each segment extracted from content delivery server 121d, where each timestamp 201 may indicate a receipt time of a corresponding segment received at monitor agent 152. Monitor agent 152 may combine the extracted segments with corresponding generated timestamps to generate delivery data 155.

Monitor agent 152 may send delivery data 155 to a memory 202. In some examples, memory 202 may be a cache memory. Memory 202 may be a memory unit configured to store delivery data 155. Memory 202 may include a memory controller 205, where memory controller 205 may be configured to facilitate receipt, transmission, and distribution, of delivery data 155 to parameter processors 220.

Parameter processors 220 may each be configured to determine parameter levels associated with parameters of an output of one or more segments 200 of content data 104. For example, parameter processor 220a may be configured to determine a level of blurriness of one or more segments 200 of content data 104. Parameter processor 220b may be configured to determine a level of pixelation of one or more segments 200 of content data 104. For example, parameter processor 220b may identify a portion of segment 200c, where the portion includes unwanted pixels. Parameter processor 220b may further determine a percentage that reflects a ratio of a size (e.g., file size) of the identified portion relative to a size of segment 200c. Parameter processor 220c may be configured to determine whether segments 200 are received at monitor agent 152 at appropriate receipt times. Each parameter processor 220 may be configured to perform respective analysis and generate respective parameter data 222. For example, a parameter processor 220 that may be configured to perform audio analysis may be configured to compare closed captioning of an output of content data 104 with subtitle files associated with content 106 that may be stored in monitor memory 144.

In an example, monitor agent 152 may be a data availability agent such that monitor agent 152 may be configured to detect an availability of segments 200 at content delivery server 121d. In response to a detection that segments 200 are available at content delivery server 121d, monitor agent 152 may extract the available segments 200 from content delivery server 121d. For example, in response to a detection that segments 200a, 200b are available at content delivery server 121d, monitor agent 152 may extract segments 200a, 200b from content delivery server 121d and subsequently, wait for an availability of segment 200c. After waiting for a period of time, monitor agent 152 may determine that segment 200c is available at content delivery server 121d and, in response, may extract segment 200c from content delivery server 121d.

Monitor agent 152 may receive segments 200a, 200b, 200c of content data 104 at respective times and, in response, may generate timestamps 201a, 201b, 201c to indicate the respective times. Monitor agent 152 may generate delivery data 155 by compiling the received segments 200a, 200b, 200c with corresponding timestamps 201a, 201b, 201c. In some examples, monitor agent 152 may further extract metadata and/or manifest data (e.g., manifest files) of content data 104 from content delivery server 121d. In some examples, delivery data 155 may further include manifest files and/or metadata that may be effective to describe each segment 200.

Monitor agent 152 may send delivery data 155 to memory 202. Memory controller 205 of memory 202 may distribute at least a portion of delivery data 155 to one or more parameter processors 220. In the example shown in FIG. 2, memory controller 205 may send delivery data 155 to parameter processors 220a, 202b, 220c. Each parameter processor 220 may receive delivery data 155 and, in response, may identify respective portions of delivery data 155 in order to generate respective parameter data 222.

In an example, parameter processor 220a may be configured to determine a level of blurriness of content 106. Parameter processor 220a may identify content data 104 among delivery data 155 and, in response, may determine parameter data 222a. Parameter processor 220a may not need to process timestamps 201 as timestamp 201 may be irrelevant to a determination of blurriness of content 106. Parameter processor 220a may be configured to process a playback of content 106 in order to analyze video frames among each segment 200 of content data 104. Parameter processor 220a may generate parameter data 222a based on the analysis of content data 104, where parameter data 222a may include data effective to indicate a level of blurriness of one or more segments 200 of content data 104. In some examples, parameter 222a may indicate whether each segment 222 exceeds a particular level of blurriness.

For example, parameter processor 220a may apply instructions relating to image processing techniques such as Laplace filters, Fast Fourier Transform, etc., on segments 200 to determine a level of blurriness for each segment 200. Parameter processor 220a may compare each determined level of blurriness to a blurriness threshold 230, where blurriness threshold 230 may be assigned and/or adjusted by content provider 131. For example, parameter data 222a may compile results of comparisons between each determined level of blurriness with blurriness threshold 230 in order to generate parameter data 222a. In the example shown in FIG. 2, parameter data 222a may include data effective to indicate whether each segment 200 may be blurry or not blurry (where, in FIG. 2, an indication of blurry is represented by a shaded box in parameter data 222a). Parameter processor 220a may send parameter data 222a to monitor processor 142.

In some examples, a value of blurriness threshold 230 may be based on a particular compression technique. For example, if content data 104 is compressed based on the H264 compression codec prior to a transmission of content data 104 from content delivery server 121d to monitor agent 152, a value of blurriness threshold 230 may be based on the H264 compression codec. In some examples, blurriness threshold 230 may be stored in a component, such as a register, of parameter processor 220a.

Continuing with the example shown in FIG. 2, parameter processor 220b may be configured to determine a level of pixelation of each segment 200. For example, parameter processor 220b may apply image processing techniques such as edge detection to determine a level of pixelation of each segment 200. Parameter processor 220b may generate parameter data 222b that may include data effective to indicate a level of pixelation of each segment 200. In some examples, parameter data 222b may indicate whether each segment 200 exceeds a particular level of pixilation. Parameter processor 220b may send parameter data 222b to monitor processor 142.

Continuing with the example shown in FIG. 2, parameter processor 220c may be configured to determine an timeliness of receipt times of segments 200 at monitor agent 152. For example, parameter processor 220c may include a storage component, such as one or more registers, configured to store protocol data 240. Protocol data 240 may include data effective to indicate receipt times of chunks, or segments 200, of content 104 based on a particular retrieval protocol. For example, if monitor agent 152 is configured to retrieve segments 200 based on the HLS protocol, protocol data 240 may include data effective to indicate receipt time of segments 200 based on the HLS protocol. Parameter processor 220c may compare timestamps 201 with receipt times indicated by protocol data 140 and, in response, may identify segments 200 that may correspond to timestamps 201 that may be significantly different from the receipt times indicated by protocol data 240. For example, protocol data 240 may further include data effective to indicate a receipt time threshold. Parameter processor 220c may determine differences between timestamps 201 and receipt times indicated by protocol data 240. Parameter processor 220c may compare the determined differences with the receipt time threshold in order to identify whether each segment 200 is received at monitor agent 152 at an appropriate receiving time. If a determined difference is greater than the receipt time threshold, then a discrepancy in receiving time is present and the corresponding segment may be marked as being received at an incorrect receipt time (where, in FIG. 2, an indication of an incorrect receipt time is represented by a shaded box in parameter data 222c). In response to the comparison, parameter processor 220c may generate parameter data 222c, where parameter data 222c may include data effective to indicate whether each segment 200 is received at a correct, or incorrect, receipt time. Parameter processor 220c may send parameter data 222c to monitor processor 142.

Monitor processor 142 may receive parameter data 222a, 222b, 222c and, in response, may generate performance data 156 based on parameter data 222a, 222b, 222c. In some examples, monitor processor 142 may store parameter data 222a, 222b, 222c, in monitor memory 144. In some examples, monitor processor 142 may update database 204, stored in monitor memory 144, based on parameter data 222a, 222b, 222c. Database 204 may be effective to indicate parameter data associated with one or more pieces of content, one or more monitor agents, etc. For example, database 204 may include entries effective to indicate correspondence among content 106, monitor agent 152, and receipt times of content data 104 at monitor agent 152. Database 204 may further include entries effective to indicate parameter data associated with each instance of collection of content data 104 at each monitor agent. For example, database 204 may indicate associations between content data 104 (associated with content 106), monitor agent 152, and timestamps 201 in order to indicate that content data 104 was collected by monitor agent 152 at a set of times corresponding to respective timestamps 201. Database 204 may further indicate associations between parameter data 222, segments 200, and timestamps 201 in order to indicate that parameter data 222 corresponds to segments 200 that were collected at timestamps 201.

Historical data processor 172 may access data among database 204 to facilitate generation of performance data 156. For example, monitor processor 142 may receive parameter data 222 and, in response, may request historical data processor 172 to retrieve one or more portions of data among database 204. In some examples, monitor processor 142 may specify the one or more portions of database 204 to be retrieved by historical data processor 172. For example, monitor processor 142 may request historical data processor 172 to retrieve a portion of database 204 that corresponds to, at least one of, one or more particular dates (dates may be indicated by timestamps), one or more monitor agents, one or more particular parameter, etc.

In some examples, database 204 may further indicate a history of deployment locations of one or more monitor agents. For example, database 204 may indicate monitor agent 152 was deployed to infrastructure 102 in the past week. Monitor processor 142 may further request historical data processor 172 to retrieve a portion of database 204 that corresponds to one or more infrastructures.

In some examples, database 204 may further indicate associations between monitor agents and one or more content delivery servers, in order to indicate the content delivery servers where data was extracted by one or more monitor agents. For example, database 204 may indicate monitor agent 152 has been collecting delivery data 155 from content delivery server 121d in the past week. Monitor processor 142 may further request historical data processor 172 to retrieve data associated with a portion of database 204 that corresponds to one or more content delivery servers.

In some examples, parameter processors 220 may each be low power devices such that each parameter processor 220 may be configured to generate parameter data 222 associated with some particular parameters while lacking hardware and/or functionality to generate parameter data 222 for other parameters. For example, parameter processors 200 may lack graphic processing units to render, or output, segments 200, but may include sufficient hardware to compare receipt times of segments 200. In some examples, parameter processors 220 that may be low power devices may be configured to perform individual frame analysis such as determination of pixelation or blurriness. In some example, when parameter processors 220 are low power devices, parameter processors may lack the hardware and/or functionality to perform cross frame analysis such as determination of framerate loss.

In examples where each parameter processor 220 may be a low power device, monitor domain 140 may further include a content controller 250 and a production processor 260. Content controller 250 may be configured to be in communication with memory 202, memory controller 205, and parameter processors 220. Production processor 260 may be configured to be in communication with monitor processor 142 and monitor memory 144.

Content controller 250 may be configured to control, or manage, distribution of segments 200 from memory 202 to parameter processors 200. In an example, content controller 250 may distribute segments 200 such that segment 200a is sent to parameter processor 220a, segment 200b is sent to parameter processor 220b, and segment 200c is sent to parameter processor 220c. In some examples, parameter processors 220 may determine parameter data 222 for segments 200a, 200b, 200c, in parallel. In other examples, content controller 250 may be configured to determine availability of one or more parameter processors 220 such that segments 200 may be distributed to parameter processors 220 that may be active or available.

Production processor 260 may be configured to determine parameter data (e.g., parameter data 222d) that may be associated with relatively complex analysis of content data 104. For example, when parameter processors 220a, 220b, 220c are each low power devices, production processor 260 may be configured to determine parameter data that may not be determined by parameter processors 220a, 220b, 220c based on parameter processors 220a, 220b, 220c being low power devices. For example, production processor 250 may be configured to perform relatively complex analysis, such as cross frame analysis, on content data 104.

In some examples, a copy of content data 104 may be stored in monitor memory 144. Parameter processors 220 and/or production processor 260 may compare an output of content data 104 that is stored in monitor memory 144 with an output of segments 200 included in delivery data 155 to identify defects of segments 200. In some examples, parameter processor 220 may hash content data 104 stored in monitor memory 144, and may hash segments 200 include in delivery data 155, and compare the hashes to determine if data was lost during the transmission of segments 200 from content delivery server 121d to monitor agent 152.

In some examples, monitor memory 144 may store metadata associated with content data 104. For example, monitor memory 144 may store manifest files associated with content data 104, where the manifest files may be effective to describe segments 200 among content data 104. Parameter processors 220 may compare metadata of content data 104 stored in monitor memory 144 with metadata included in delivery data 155 in order to determine whether segments 200 received by monitor agent 152 are identical to content data 104 stored in monitor memory 104. In some examples, parameter processors 220 may compare the stored manifest files with manifest files included in delivery data 155 to determine whether segments 200 received by monitor agent 152 are identical to content data 104 stored in monitor memory 104. In some examples, parameter processors 220 may compare hashes of metadata or manifest files stored in monitor memory 144, with hashes of metadata of manifest files included in delivery data 155, to determine an authenticity of segments 200 received by monitor agent 152.

Monitor processor 142 may generate performance data 156 based on parameter data 222, data retrieved by historical data processor 172, and/or parameter data 222d generated by production processor 250. Performance data 156 may include data effective to indicate a performance of a delivery and/or an output of content data 104. As will be described in more detail below, performance data 156 may include data effective to indicate whether one or more segments 200 are defective, and how many defected parameters are present among each segment 200.

Figure 3:
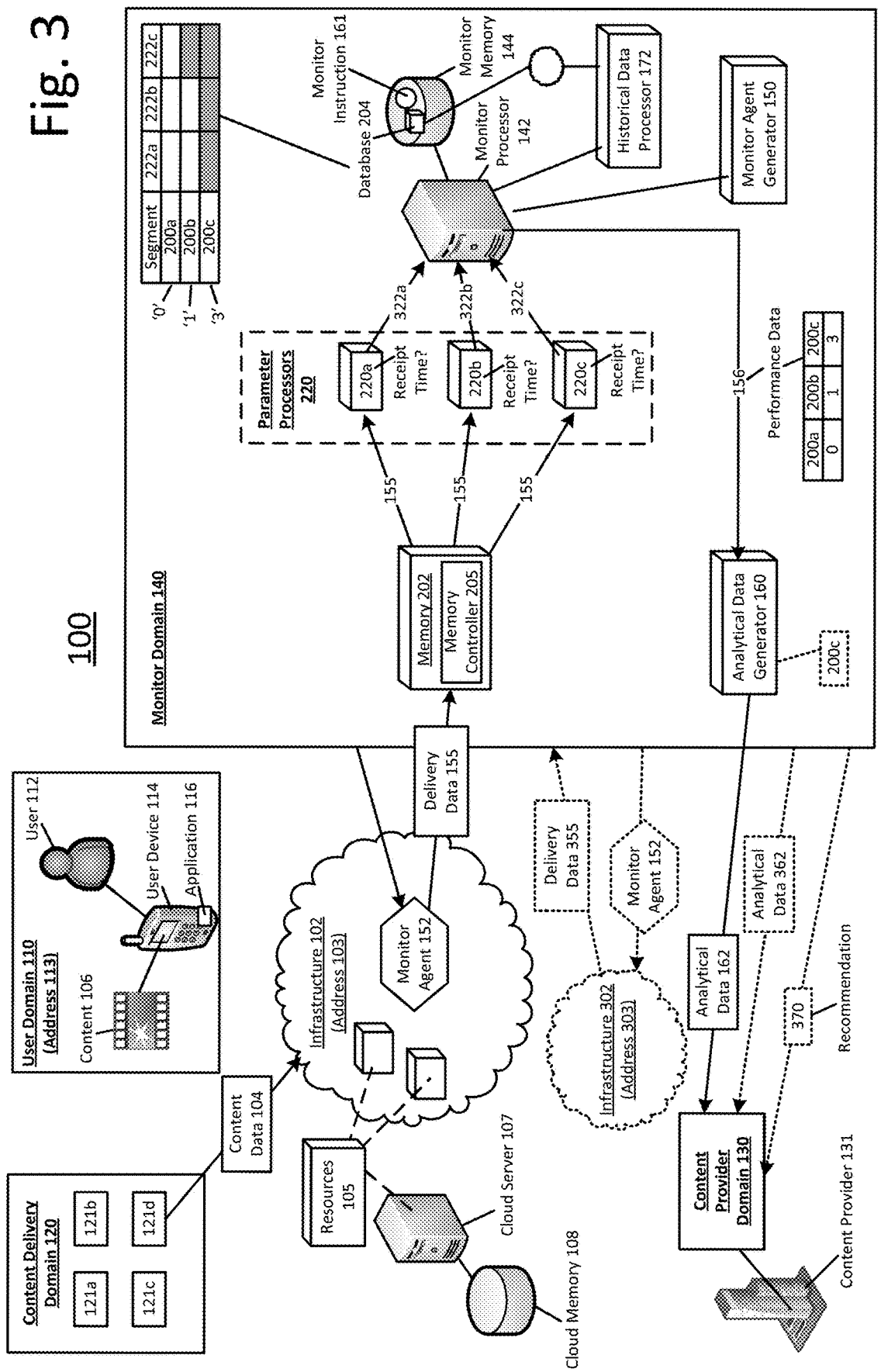
FIG. 3 illustrates the example system of FIG. 1 with additional details relating to an implementation of a content delivery monitor.

FIG. 3 illustrates the example system of FIG. 1 with additional details relating to an implementation of a content distribution monitor, arranged in accordance with at least some embodiments described herein. The example system in FIG. 3 could be implemented as, for example, system 100 discussed above. Those components in FIG. 3 that are labelled identically to components of FIGS. 1-2 will not be described again for the purposes of clarity.

Monitor processor 142 may generate performance data 156 based on parameter data 222 and/or data in database 204. In an example shown in FIG. 3, monitor processor 142 may determine, for each segment 200, a number of defects present in the corresponding segment. For example, monitor processor 142 may determine that segment 200a includes zero ('0') defects, segment 200b includes one ('1') defect, and segment 200c includes three ('3') defects. Monitor processor 142 may generate performance data 156 based on the determined number of defects for each segment 200. Monitor processor 142 may generate performance data 156 such that performance data 156 may include indications of the number of defects for each segment 200. In the example shown in FIG. 3, performance data 156 may indicate that segment 200a includes zero defects, segment 200b includes one defect, and segment 200c includes three defects. Monitor processor 142 may send performance data 156 to analytical data generator 160.

Analytical data generator 160 may analyze performance data 156 to determine a presence of one or more segments, among content data 104, that may be defective. For example, monitor instruction 161 may include a segment defect threshold 302, where segment defect threshold 302 may include an indication of a number of defects that may be used by analytical data generator 160 to categorize a segment as defective. Defective threshold 250 may indicate two defects, such that a segment that includes two or more defects may be categorized as defective, and a segment that includes less than two defects may be categorized as not defective. In response to a particular segment being categorized as defective, analytical data generator 160 may determine that there is a presence of a defected portion (e.g., the particular segment) among content data 104.

In some examples, a presence and/or an absence of one or more defective segments among content data 104 may indicate an efficiency of a delivery of content data 104 from content delivery domain 120 to user domain 110. For example, an absence of defective portions among content data 104 may indicate an efficient delivery of content data 104, whereas a presence of defective portions among content data may indicate an inefficient deliver of content data 104.

In the example shown in FIG. 3, analytical data generator 160 may generate analytical data 162 based on performance data 156 and defective threshold 302. For example, Analytical data generator 160 may compare each number of defects, of each segment 200, among performance data 156 with segment defect threshold 302 and, in response, may identify segments 200 that may be categorized as defective. In the example, segments 200a, 200b may be categorized as not defective, and segment 200c may be categorized as defective.

Analytical data generator 160 may generate analytical data 162 based on the identification of segments 200 as defective or not defective. For example, analytical data generator 160 may generate analytical data 162 that may indicate among segments 200, there is one defective segment, and/or thirty-three percent (two out of three) of segments are defective. Analytical data 162 may further include an identification of the defective segments, and the associated defects of the defected segment. In some examples, analytical data 162 may be output, such as by content provider domain 130, as a report that may include indications of defected segments.

Analytical data generator 160 may send analytical data 162 to content provider domain 130. Content provider domain 130 may use analytical data 162 to evaluate a delivery of content data 104 from content delivery domain 120 to user domain 110. For example, analytical data 162 may be used to evaluate a delivery of content data 104 from content delivery server 121d to user device 114, where user device 114 may request content data 104 from content delivery domain 120 using infrastructure 102. In some examples, content provider domain 130 may use analytical data 162 to determine whether adjustments to storage locations, storage methods, content retrieval protocols, etc., of content data 104 are necessary. In some examples, content provider domain 130 may use analytical data 162 to determine whether hardware at particular content delivery domains are performing at an acceptable level. In some examples, in response to segment 200c being identified by analytical data 162, content provider domain 130 may determine to replace segment 200c stored in content delivery server 121d with a new copy of segment 200c. In some examples, in response to segment 200c being identified by analytical data 162, content provider domain 130 may identify a new content delivery server different from content delivery server 121d to store content data 104. In some examples, in response to segment 200c being identified by analytical data 162, content provider domain 130 may identify a content delivery server that may be located in a different geographical region from a location of content delivery server 121d to store content data 104.

In some examples, in response to segment 200c being identified by analytical data 162 as defective, content provider domain 130 may identify an infrastructure 302 at address 303, where infrastructure 302 may be different from infrastructure 102. Content provider 130 may request monitor domain 140 to deploy one or more monitor agents 152 to infrastructure 302. Monitor agents 152 deployed to infrastructure 302 may extract content data 104 from content delivery server 121d using resources of infrastructure 302, and may generate a new set of delivery data 355. Monitor domain 140 may compare delivery data 355 with delivery data 155, and based on the comparison, may generate a new set of analytical data 362. Analytical data 362 may identify one or more segments 200 that may be defective. Content provider domain 130 may compare analytical data 362 with analytical data 162 to determine whether infrastructure 102 or infrastructure 302 should be used to facilitate delivery of content data 104 to user domain 110. For example, if analytical data 162 identifies more defective segments than analytical data 362, content provider domain 130 may determine to use infrastructure 302 to facilitate delivery of content data 104 to user domain 110.

In some examples, analytical data generator 160 may perform the comparison of analytical data 362 and analytical data 162 and, in response, may generate a recommendation 370, and may send recommendation 370 to content provider domain 130. Recommendation 370 may be data effective to indicate a recommendation based on an outcome of the comparison of analytical data 162 and analytical data 362. For example, recommendation 370 may indicate a preference to select infrastructure 302 over infrastructure 102. In some examples, recommendation 370 may indicate whether to identify another content delivery server to store content data 104, replace a copy of content data 104 stored in content delivery domain 120, or make no changes, etc.

In some examples, monitor domain 140 may deploy more than one monitor agents 152 to one or more infrastructures. For example, monitor agent 152 may be deployed to both infrastructure 102 and infrastructure 302. As a result of deploying monitor agent 152 to both infrastructures 102, 302, monitor domain 140 may receive two sets of delivery data, such as delivery data 155 and delivery data 355. Accordingly, analytical data generator 160 may generate recommendation 370 based on a comparison of analytical data 162 (based on delivery data 155) and analytical data 362 (based on delivery data 355). Thus, monitor domain 140 may perform analysis associated with content delivery from different regions and/or infrastructures.

In another example, monitor domain 140 may deploy different monitor agents (e.g., each monitor agent may simulate respective request, from respective user device, at respective address) to each infrastructure, and may generate different analytical data based on delivery data received from the different monitor agents. Thus, monitor domain 140 may perform analysis based on simulations of user experience associated with different user devices at different regions and/or infrastructures.

In another example, monitor domain 140 may deploy monitor agents to one or more infrastructures, and may instruct each deployed monitor agent to extract content data 104 from two or more content delivery servers 121 in content delivery domain 120 in order to perform analysis on content data being delivered from different content delivery servers.

In some examples, monitor agent 152 may be configured to extract content data associated with one or more versions of content 106 from content delivery domain 120. For example, monitor agent 152 may be configured to extract first content data associated with content 106 of a high-definition video mode, and may be configured to extract second content data associated with content 106 of a ultra high-definition video mode. Parameter processors 220 may generate respective sets of parameter data for the first content data and the second content data. Monitor processor 142 may generate respective performance data for the first content data. Analytical data generator 160 may generate first analytical data that corresponds to the first content data, and may generate second analytical data that corresponds to the second content data. Analytical data generator 160 may send the first and second analytical data to content provider domain 130. Content provider domain 130 may compare the first analytical data with the second analytical data to determine whether adjustments, such as whether to continue offering content 106 of ultra high-definition video mode, may be necessary. In another example, monitor agent 152 may be configured to include target aspects of monitor domain 140.

Among other benefits, a system in accordance with this disclosure may provide a platform for content providers to determine whether adjustments are needed to improve customer experience with content delivery. A system in accordance with this disclosure may also allow agents to be deployed in a cloud computing platform to extract content data for analysis, rather than seeking permission from users in order to install monitoring applications on user devices. A system in accordance with this disclosure may also eliminate a need to embed monitoring into the applications delivered to a user in order to track the user's experience. A system in accordance with this disclosure may also provide flexibility to content providers by providing a platform that may obtain analytical data from a wide range of sample sizes. For example, hundreds of monitor agents may be deployed (or tens of monitor agents may be deployed multiple times) to a cloud computing platform to monitor content delivery, instead of waiting for hundreds of user devices to activate in order to analyze usage of the activated user devices. Further, content providers may specify particular content to analyze, instead of waiting for a significant amount of users to view the particular content in order to perform analysis.

Figure 4:
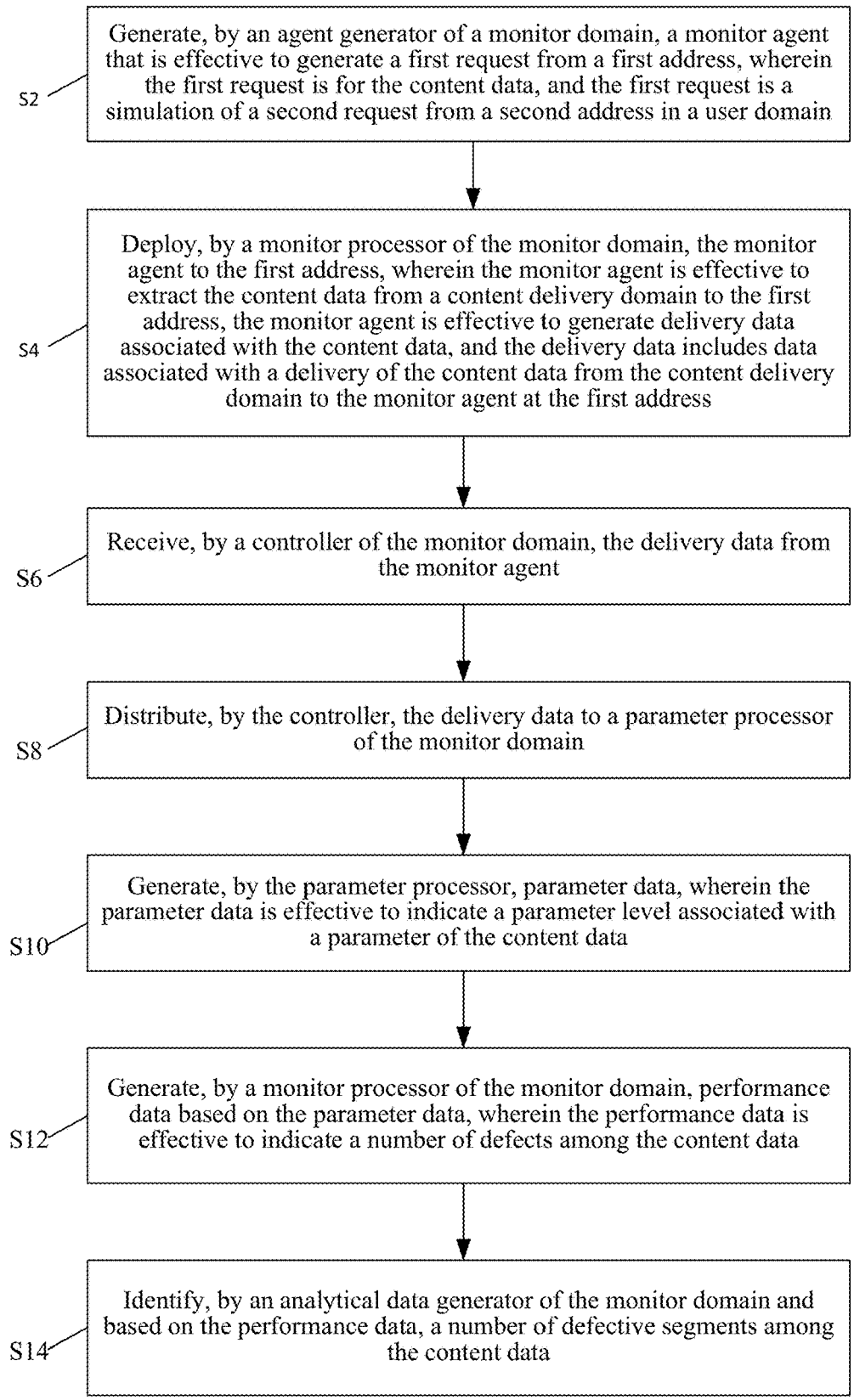
FIG. 4 illustrates a flow diagram for an example process to implement a content delivery monitor.

FIG. 4 illustrates a flow diagram for an example process to implement a content delivery monitor, arranged in accordance with at least some embodiments described herein. The process in FIG. 4 could be implemented using, for example, system 100 discussed above. An example process may include one or more operations, actions, or functions as illustrated by one or more of blocks S2, S4, S6, S8, S10, S12, and/or S14. Although illustrated as discrete blocks, various blocks may be divided into additional blocks, combined into fewer blocks, or eliminated, depending on the desired implementation.

Processing may begin at block S2 "Generate, by an agent generator of a monitor domain, a monitor agent that is effective to generate a first request from a first address, wherein the first request is for the content data, and the first request is a simulation of a second request from a second address in a user domain." At block S2, an agent generator of a monitor domain may generate a monitor agent. The monitor agent may be effective to generate a first request from a first address. The first request may be for the content data. The first request may be a simulation of a second request from a second address in a user domain.

Processing may continue from block S2 to block S4 "Deploy, by a monitor processor of the monitor domain, the monitor agent to the first address, wherein the monitor agent is effective to extract the content data from a content delivery domain to the first address, the monitor agent is effective to generate delivery data associated with the content data, and the delivery data includes data associated with a delivery of the content data from the content delivery domain to the monitor agent at the first address." At block S4, a monitor processor may deploy the monitor agent to the first address. The monitor agent may be effective to extract the content data from a content delivery domain to the first address. The monitor agent may be effective to generate delivery data associated with the content data. The delivery data may include data associated with a delivery of the content data from the content delivery domain to the monitor agent at the first address.

Processing may continue from block S4 to block S6 "Receive, by a controller of the monitor domain, the delivery data from the monitor agent." At block S6, a controller of the monitor domain may receive the delivery data from the monitor agent.

Processing may continue from block S6 to block S8 "Distribute, by the controller, the delivery data to a parameter processor of the monitor domain." At block S8, the controller may distribute the delivery data to a parameter processor of the monitor domain.

Processing may continue from block S8 to block S10 "Generate, by the parameter processor, parameter data, wherein the parameter data is effective to indicate a parameter level associated with a parameter of the content data." At block S10, the parameter processor may generate parameter data. The parameter data may be effective to indicate a parameter level associated with a parameter of the content data.

Processing may continue from block S10 to block S12 "Generate, by a monitor processor of the monitor domain, performance data based on the parameter data, wherein the performance data is effective to indicate a number of defects among the content data." At block S12, a monitor processor may generate performance data based on the parameter data. The performance data may be effective to indicate a number of defects among the content data.

Processing may continue from block S12 to block S14 "Identify, by an analytical data generator of the monitor domain and based on the performance data, a number of defective segments among the content data." At block S14, an analytical data generator of the monitor domain may identify a number of defective segments among the content data. The identification may be based on a number of defective segments among the content data.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for identifying defective segments of content data associated with a piece of content, the method comprising:
    generating, by an agent generator of a monitor domain, a monitor agent to generate a first request from a first address, wherein the first request is for the content data, and the first request is a simulation of a second request from a second address in a user domain;
    deploying, by a monitor processor of the monitor domain, the monitor agent to the first address, wherein the monitor agent extracts the content data from a content delivery domain to the first address, the monitor agent generates delivery data associated with the content data, and the delivery data includes data associated with a delivery of the content data from the content delivery domain to the monitor agent at the first address;
    receiving, by a controller of the monitor domain, the delivery data from the monitor agent;
    distributing, by the controller, the delivery data to a parameter processor of the monitor domain;
    generating, by the parameter processor, parameter data, wherein the parameter data indicates a parameter level associated with a parameter of the content data;
    generating, by a monitor processor of the monitor domain, performance data based on the parameter data, wherein the performance data indicates a number of defects among the content data;
    identifying, by an analytical data generator of the monitor domain and based on the performance data, a number of defective segments among the content data, wherein a presence of defective segments indicates an efficiency of the delivery of the content data from the content delivery domain to the user domain;
    generating, by the analytical data generator, analytical data based on the performance data, wherein the analytical data indicates the identified defective segments among the content data; and
    evaluating, by the analytical data generator, the delivery of the content data from the content delivery domain to the user domain based on the analytical data.

2. The method of claim 1, wherein the monitor agent further extracts the content data from the content delivery domain based on a content retrieval protocol.

3. The method of claim 1, wherein generating the parameter data comprises:
    outputting, by the parameter processor, the content data; and
    comparing, by the parameter processor, the output of the content data with a threshold associated with the parameter.

4. The method of claim 1, wherein generating the performance data comprises determining, by the parameter processor, the number of defects associated with one or more segments of the content data.

5. The method of claim 1, wherein identifying the number of defective segments among the content data comprises:
    comparing, by the analytical data generator, the number of parameter defects with a threshold, wherein the number of defects is associated with a particular segment of the content data; and
    in response to the number of defects being greater than the threshold, identifying the particular segment as a defective segment.

6. The method of claim 1, further comprising, generating, by the analytical data generator of the monitor domain, analytical data based on the performance data, wherein the analytical data indicates the identified defective segments among the content data.

7. The method of claim 6, further comprising sending, by the analytical data generator, the analytical data to a content provider domain.

8. A system effective to identify defective segments of content data associated with a piece of content, the system comprising:
    a memory;
    an agent generator configured to be in communication with the memory;
    a monitor processor configured to be in communication with the agent generator and the memory;
    a controller configured to be in communication with the monitor processor;
    a parameter processor configured to be in communication with the controller and the monitor processor;
    an analytical data generator configured to be in communication with the monitor processor;
    the agent generator being configured to generate a monitor agent generate a first request from a first address, wherein the first request is for the content data, and the first request is a simulation of a second request from a second address in a user domain;

the monitor processor being configured to deploy the monitor agent to the first address, wherein the monitor agent extracts the content data from a content delivery domain, the monitor agent generates delivery data associated with the content data, and the delivery data includes data associated with a delivery of the content data from the content delivery domain to the monitor agent at the first address;

the controller being configured to:
  receive the delivery data from the monitor agent; and
  distribute the delivery data to the parameter processor;

the parameter processor being configured to:
  generate parameter data, wherein the parameter data indicates a parameter level associated with a parameter of the content data; and
  send the parameter data to the monitor processor;

the monitor processor being further configured to:
  generate performance data based on the parameter data, wherein the performance data indicates a number of defects among the content data;
  send the performance data to the analytical data generator;

the analytical data generator being configured to, based on the performance data, identify a number of defective segments among the content data, generate analytical data based on the performance data, wherein the analytical data indicates the identified number of defective segments among the content data, and evaluate the delivery of the content data from the content delivery domain to the user domain based on the analytical data.

9. The system of claim 8, wherein the monitor agent further extracts the content data from the content delivery domain based on a content retrieval protocol stored in the memory.

10. The system of claim 8, wherein the parameter processor is further configured to:
  output the content data; and
  compare the output of the content data with a threshold associated with the parameter to generate the parameter data.

11. The system of claim 8, wherein the memory is configured to store the content data, and the parameter processor is further configured to:
  output one or more segments of the content data; and
  compare the output of the one or more segments with the content data stored in the memory to generate the parameter data.

12. The system of claim 8, wherein the monitor processor is further configured to:
  determining the number of defects associated with one or more segments of the content data; and
  generate the performance data based on the determined number of defects associated with the one or more segments of the content data.

13. The system of claim 8, wherein the analytical data generator is further configured to:
  compare the number of defects associated with a segment of the content data with a threshold, wherein the number of defects is associated with a particular segment of the content data; and
  in response to the number of defects being greater than the threshold, identify the particular segment as a defective segment.

14. The system of claim 8, wherein the analytical data generator is further configured to generate analytical data based on the performance data, the analytical data is effective to indicate the identified defective segments among the content data.

15. The system of claim 8, wherein the analytical data generator is further configured to send the analytical data to a content provider domain.

* * * * *